US012330910B1

(12) United States Patent
Macareno et al.

(10) Patent No.: US 12,330,910 B1
(45) Date of Patent: Jun. 17, 2025

(54) ELEVATOR SWITCH ADAPTER

(71) Applicant: RN Miami Enterprises LLC, Miami, FL (US)

(72) Inventors: Ricardo Macareno, Miami, FL (US); Nelson Alonso, Miami, FL (US)

(*) Notice: Subject to any disclaimer, the term of this patent is extended or adjusted under 35 U.S.C. 154(b) by 0 days.

(21) Appl. No.: 18/895,245

(22) Filed: Sep. 24, 2024

(51) Int. Cl.
*B66B 1/50* (2006.01)
*B66B 1/48* (2006.01)
*B66B 5/00* (2006.01)

(52) U.S. Cl.
CPC .................. *B66B 1/50* (2013.01); *B66B 1/48* (2013.01); *B66B 5/0056* (2013.01)

(58) Field of Classification Search
CPC .......... B66B 1/48; B66B 1/50; B66B 5/0056; B66B 5/0062; B66B 5/0068; B66B 5/0093; B66B 5/048
See application file for complete search history.

(56) References Cited

U.S. PATENT DOCUMENTS

| | | | | |
|---|---|---|---|---|
| 1,580,363 A * | 4/1926 | Baruch | B66B 1/48 187/284 |
| 6,227,334 B1 * | 5/2001 | Yumura | B66B 5/048 187/373 |
| 8,181,749 B2 * | 5/2012 | Okada | B66B 5/044 187/287 |
| 2010/0155182 A1 * | 6/2010 | Ueda | B66B 5/288 187/280 |
| 2021/0147184 A1 * | 5/2021 | Shah | B66B 27/00 |

* cited by examiner

*Primary Examiner* — Minh Truong
(74) *Attorney, Agent, or Firm* — Christopher J. VanDam PA; Chris Van Dam

(57) ABSTRACT

An elevator switch adapted that ambidextrously attaches to either side of an emergency elevator off-on-off car safeties switch that biases the switch into the on position while blocking one of the off positions. The elevator car safeties temporarily, electrically limits elevator function in an over-speed situation.

2 Claims, 10 Drawing Sheets

ELEVATOR SWITCH ADAPTER

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to elevators in buildings, and more particularly, to an improved device and method of use of a switch to aid in maintenance and inspection procedures.

2. Description of Related Art Including Information Disclosed Under 37 CFR 1.97 and 37 CFR 1.98

The prior art has filed to solve the issues related to elevator safety testing of safety switches. For the past 60-plus years elevators have included a singular design of safety switch that is triggered when the elevator car safeties are tested to prevent uncontrolled elevator falls. The prior art switches require a first technician in front of the elevator controller or above the cab (also referred to as the car, compartment or cabin) to conduct the testing and a second technician below the cab to reset the car safeties switch (the plank switch and safety operators switch) at the completion of the testing procedure.

Prior art testing procedures include an ambidextrous switch connected to a linkage that automatically arrests the fall of the elevator when overspeed is detected. During periodic mandated testing this emergency brake system is tested to ensure it functions properly. The elevator speed governor is intentionally tripped causing the safety linkage to operate, engaging the safeties and actuating the car safeties switch. The technicians then lift the elevator to reset the car safeties and then reset the switch from under the cab to place the elevator back into service.

This procedure can take two technicians about 4 hours to complete. One technician controls operation of the cab from above or in front of the controller. A second technician must position himself below the cab to physically reset the one or more emergency stop switches before the elevator can be placed in a normal operation mode and return to service after successful testing. This is both dangerous to be below the cab and is also time-consuming and costly with two technicians. The technicians also must communicate which increases the potential for error in calibration and increase the risk to the technicians.

With the present design, a single technician can greatly reduce the time and manpower required for these elevator inspections. Safety is also greatly improved because no technician is required to be below the cab for any part of the car safeties testing.

Applicant believes that the closest prior art reference corresponds to elevator switches in use for many years. The design has not substantially changed in over six decades. Typically, a left and right switch is connected by mechanical linkage to the car safeties. These switches are ambidextrous to allow a single design of switch to be fitted to both the left and right side by inverting the switch on one side. The switches do not allow for the switch to be deactivated and placed in a normal operation mode once the elevator is hoisted from a overspeed-lock condition. Although a generally accepted safe device, the testing procedures are time-consuming and dangerous to complete.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide an accessory device to existing switches to automatically allow resetting of the switch during testing.

It is another object of this invention to provide an ambidextrous device to fit on either left or right switch bodies.

It is still another object of the present invention to greatly reduce the risk to technicians below the elevator car during testing and maintenance.

Another object of the invention is to reduce the time required for elevatortesting and also allow for a single technician, instead of a pair, to complete the inspection.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWINGS

With the above and other related objects in view, the invention exists in the details of construction and combination of parts as will be more fully understood from the following description, when read in conjunction with the accompanying drawings in which.

DETAILED DESCRIPTION OF THE INVENTION

Figure 1:
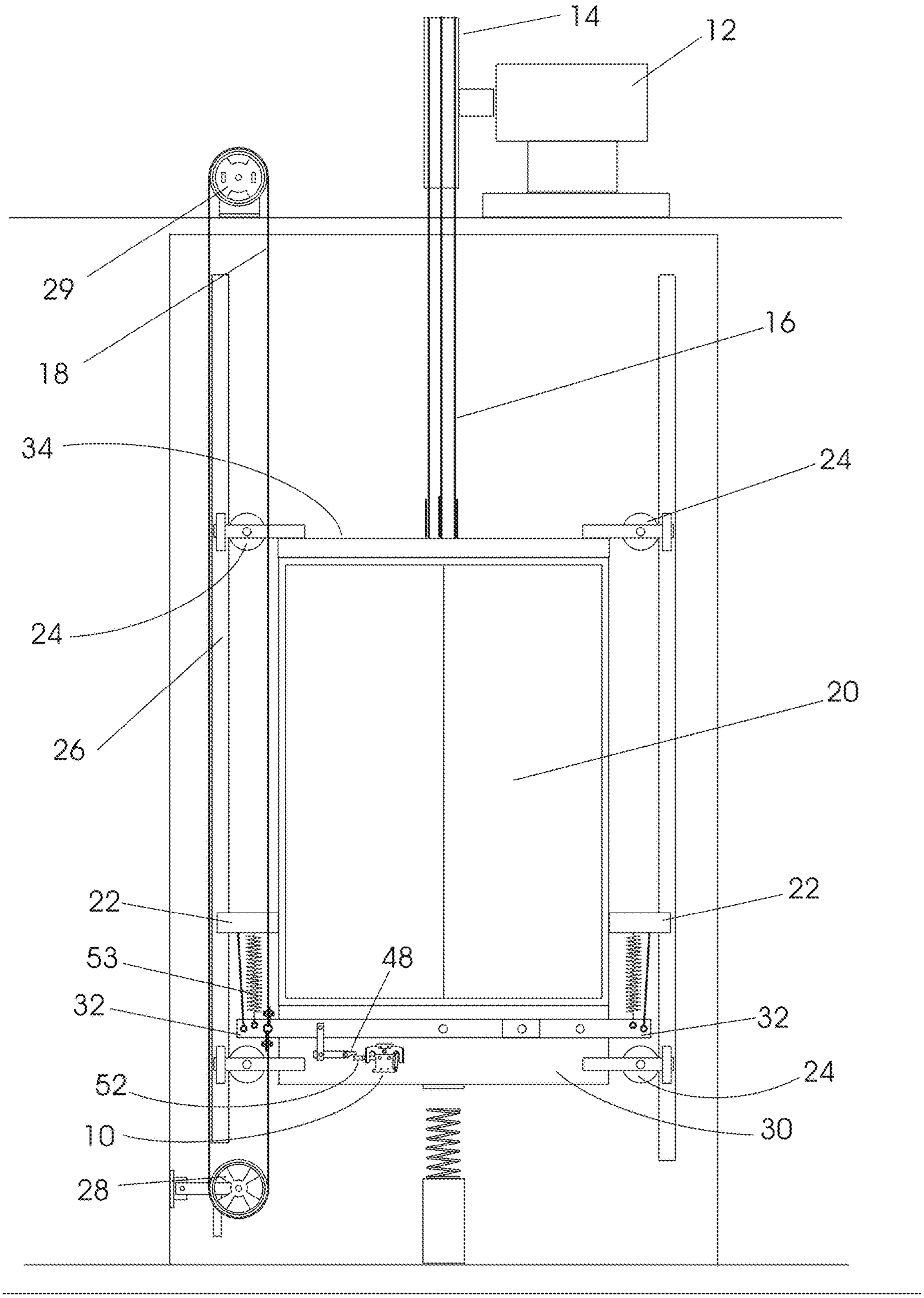
FIG. 1 shows an elevation view of the components of a typical elevator system.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the elevator switch, the automatic switch, the stopping switch, the overspeed switch, the car safety switch, the safety operator which, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a motor 12, a main pulley 14, a main cable 16, a governor rope 18, a car 20, a safety shoes 22, a rail guide 24, a guide Rail 26, a governor pulley 28, a speed governor 29, a plank 30, a brake linkage 32, a frame 34, a switch adapter 36, a stop flange 38, a spring 40, a plate 42, a support 44, a brace flange 46, a trigger 48, a switch box 50, a switch arm 52, and aperture 54, a fastener 56, a pivot 58, a bar 60, an arm 62, a pivot 64, a spring 66, and anchor 68, a plate 70, eight switch adapter 72, a stop flange 74, a fastener 76, and alignment flange 78, an arm 80, a spring 81, a pivot 82 and a bar 86.

FIG. 1 shows a typical elevator assembly. The car 20 is suspended in the elevator shaft by the main cable 16. The main cable 16 is wound around the main pulley 14 and is raised and lowered with the motor 12. The plank 30 is the structural element onto which the frame 34 of the car 20 is assembled. Guide wheels 24 on each side of the car 20 ride in guide rails 26 to keep the car 20 aligned vertically.

A governor rope 18 rides along the upper and lower governor pulleys 28 to the side of the car 20 the governor rope 18 connects to the safety brake 22. A brake linkage 32 interconnects the safety brake 22 to the elevator switch assembly 10. If the car 20 descends at or above a specified rate a centrifugal mechanism on the speed governor 29 trips locking the governor rope 18. As the car continues to descend, the stopped governor rope 18 pulls the linkage of the car safeties 32. The movement of the linkage actuates the trigger 48 to rotate downward thus tripping the switch lever 52. Cutting the power to the elevator motor 12 by activating switch assembly 10.

A governor rope 18 rides along the upper and lower governor pulleys 28 to the side of the car 20 the governor rope 18 connects to the safety brake 22. A brake linkage 32 interconnects the safety brake 22 to the elevator switch assembly 10. If the car 20 descends at or above a specified rate a centrifugal mechanism in the safety brake 22 moves the brake linkage 32 to turn off the power to the motor 12 by activating the switch assembly 10.

During elevator testing the car safety 22 is actuated to cause the linkage 32 to interact with the elevator switch 10 to cut off power to the motor 12. Once the functioning of the car safety 22 is proven, the elevator is lifted a short distance to disengage the car safety 22. The switch assembly 10 then must be turned back on to allow the normal operation of the elevator 12.

Figure 3:
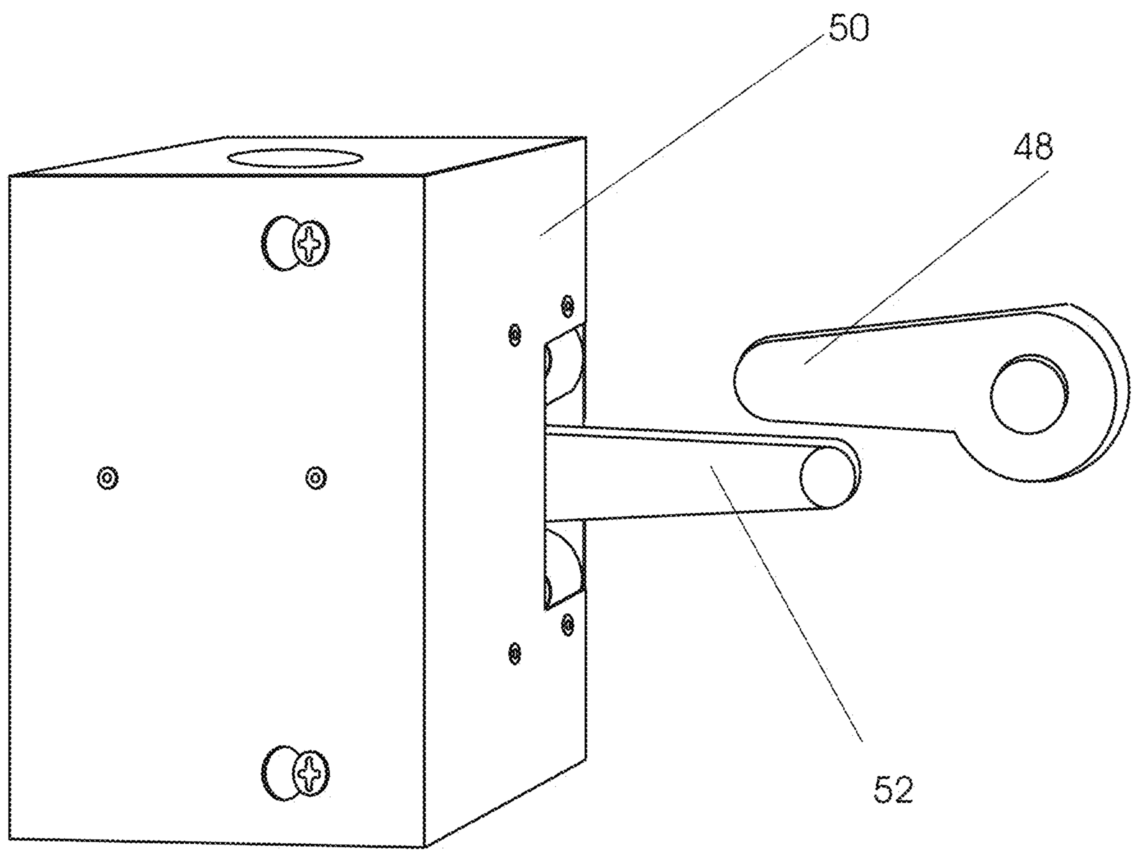
FIG. 3 shows a perspective view of an un-triggered prior art elevator switch.
Figure 4:
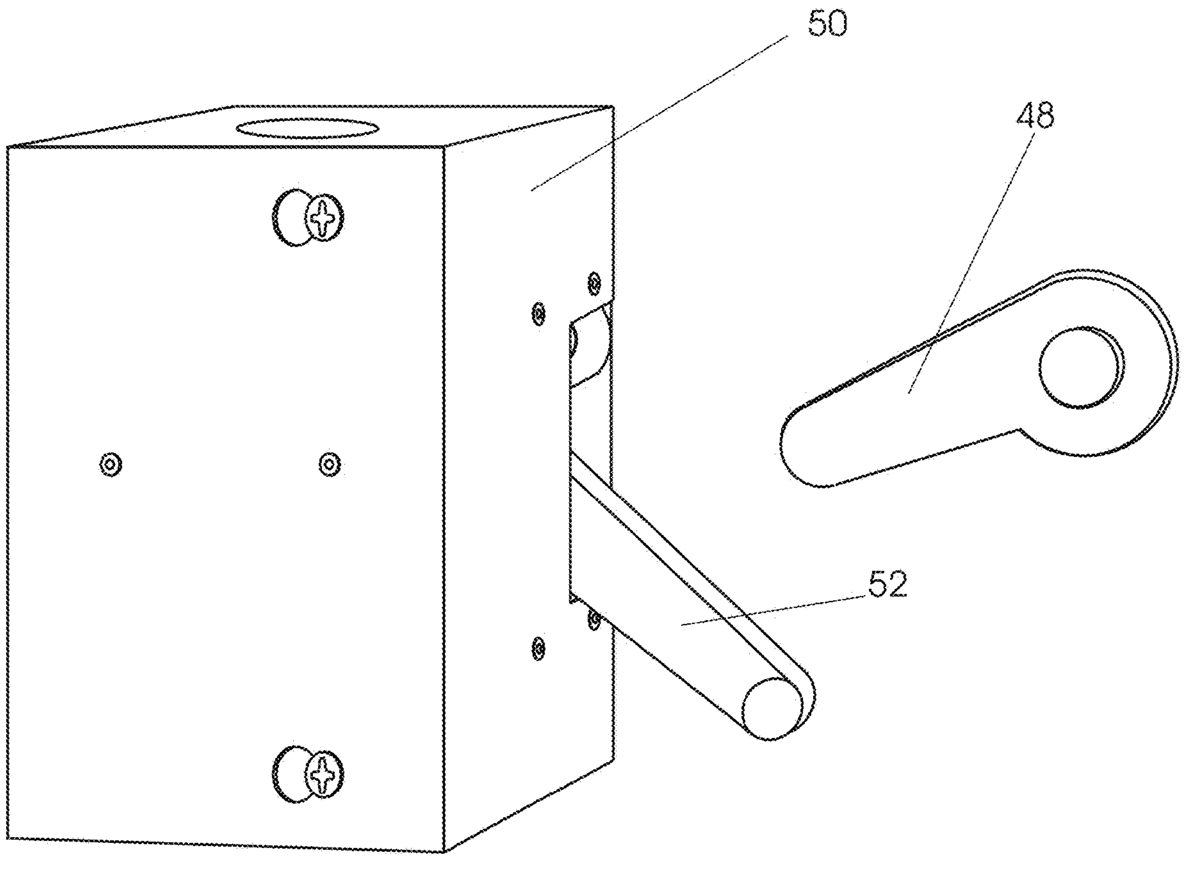
FIG. 4 shows a perspective view of an activated safety trigger prior art elevator switch.

Looking now at FIGS. 3 and 4, prior art elevator switches are shown. In FIG. 3 the switch arm is at the horizontal position as it would be in normal operation. The trigger 48 is near the switch arm 52 but does not engage the switch arm 52. If the switch arm 52 is moved either up or down, the power to the elevator is interrupted. This normally happens during an event where the elevator descends too quickly or during a periodic inspection and the safety brake 22, through the brake linkage 32, moves the trigger 48 that in turn activates the switch arm 52.

These prior art switches are ambidextrous in that they can be placed either on the right side or left side of the elevator. On one side of the switch is inverted. This way a single style of switch box 50 can be used on both the left and right side of the elevator. A problem in the design is that the switch arm 52 does not automatically return to a middle, on position. Once the switch arm 52 is moved up or down, depending on the side of the elevator, the switch box 50 prevents power from reaching the motor 12 until the switch arm 52 is manually moved to the middle, a horizontal position by a technician under the elevator cab.

Figure 2:
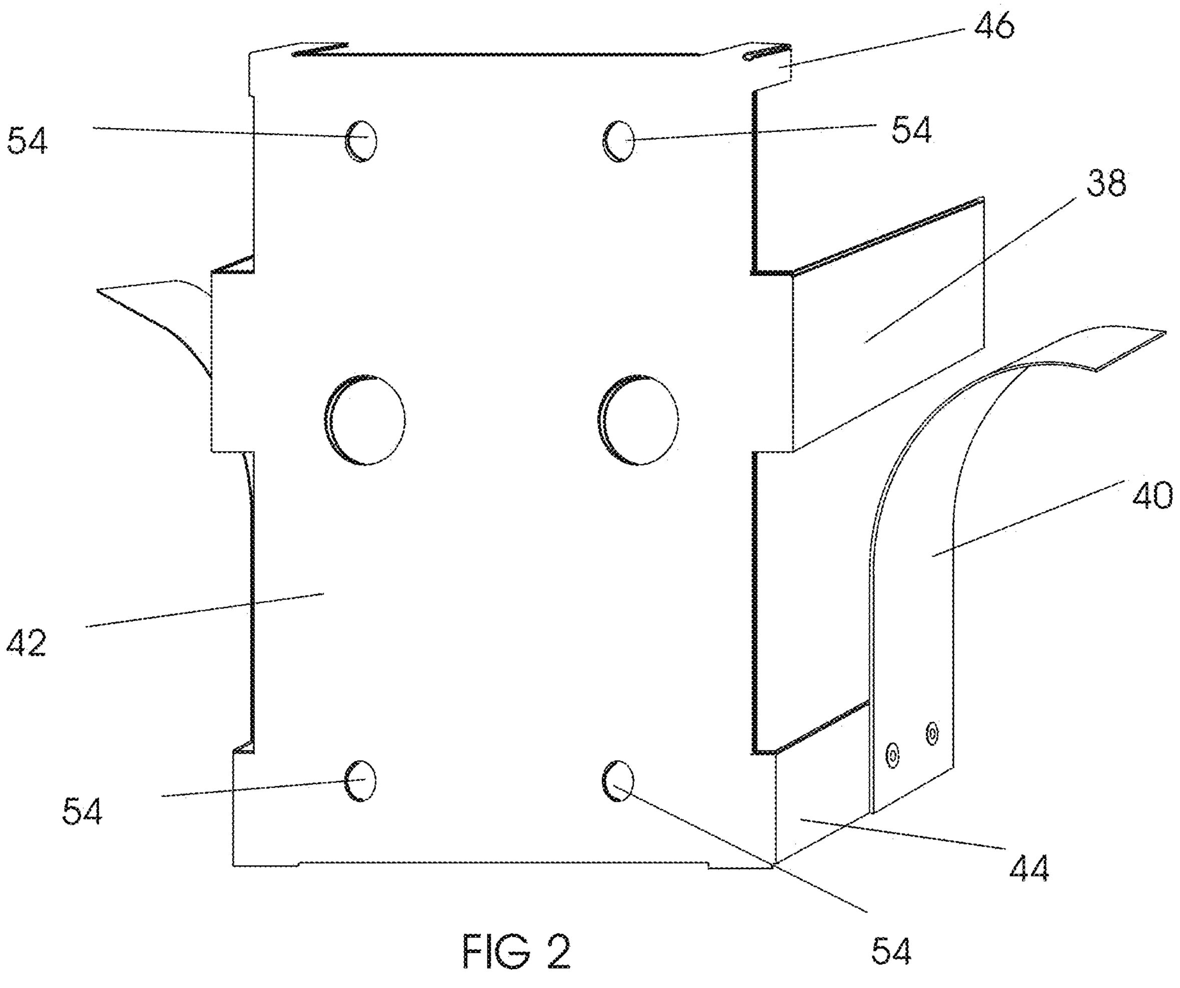
FIG. 2 shows a perspective view of an example of the accessory device isolated from the prior art switch.
Figure 5:
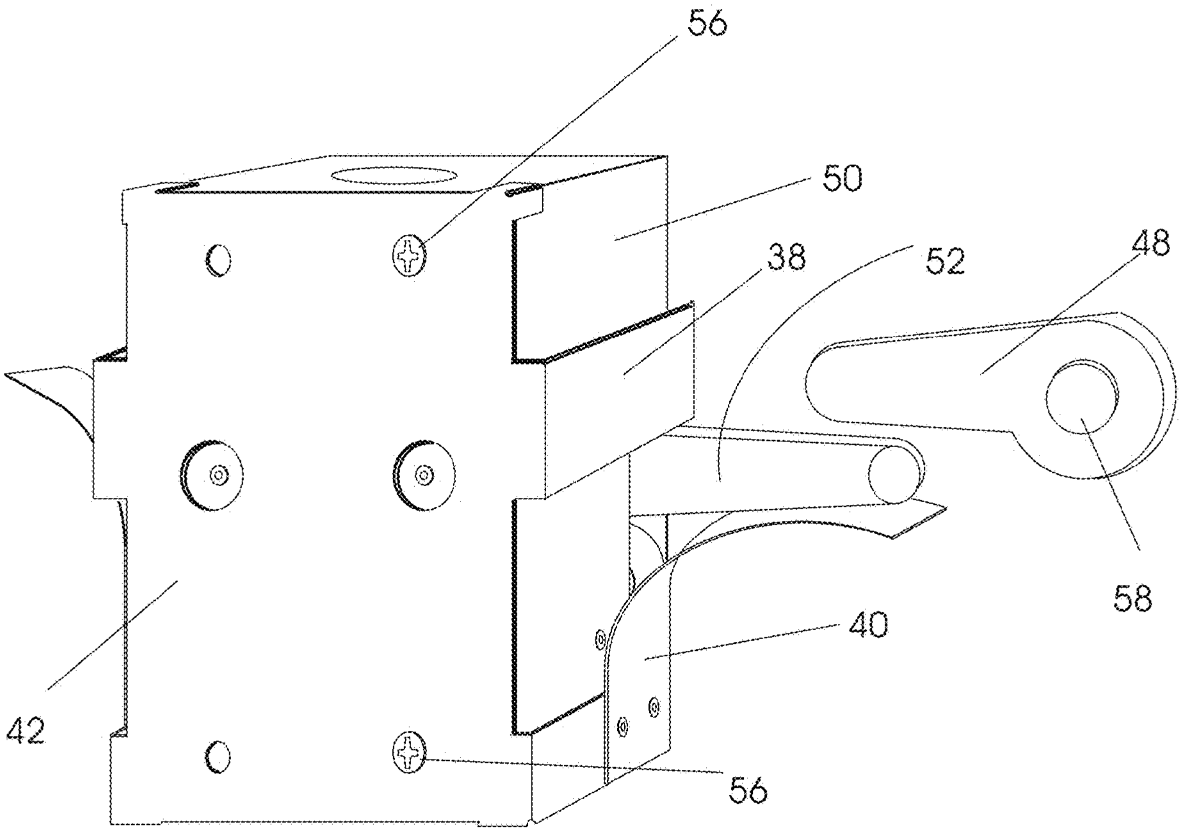
FIG. 5 shows a perspective view of the present invention affixed to a prior art switch in an un-triggered mode.
Figure 6:
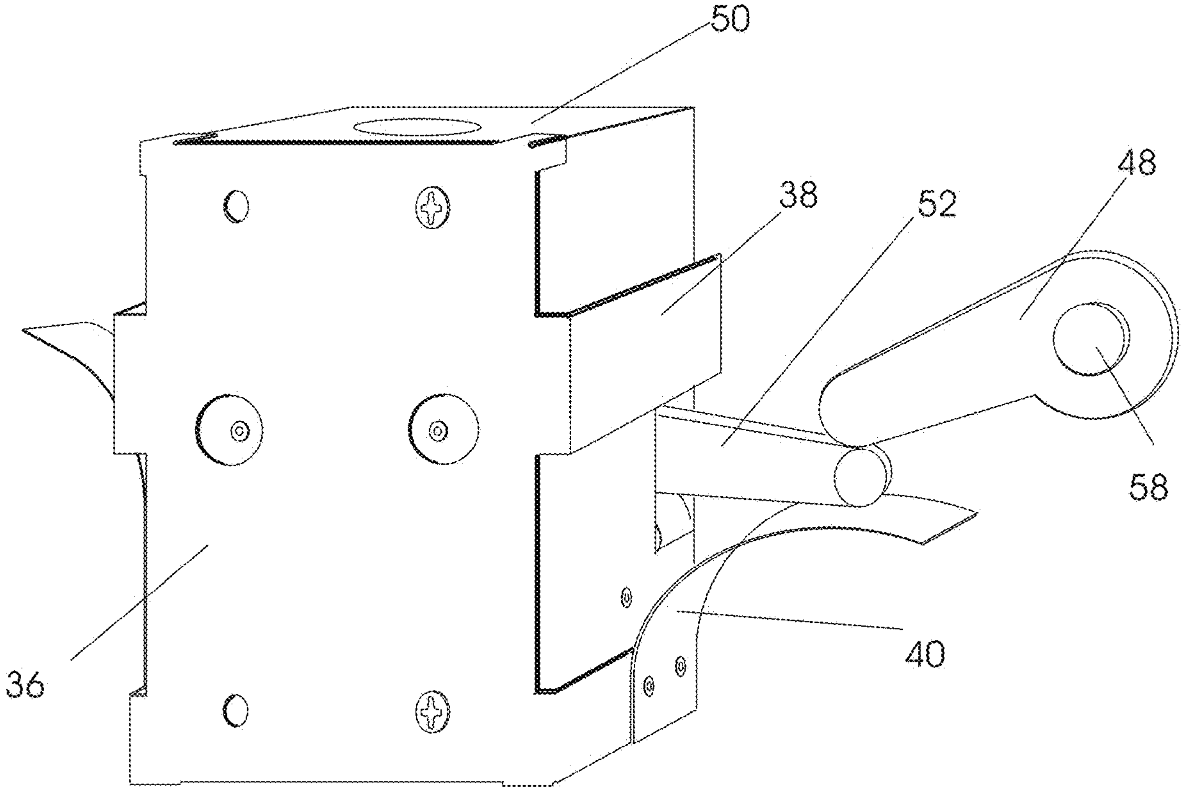
FIG. 6 shows a perspective view of the present invention affixed to a prior art switch in a triggered mode.

FIG. 2 shows an example of the essential components of the present elevator switch adapter 36. FIGS. 5 and 6 show the switch adapter 36 affixed to a switch box 50. The switch box 50 is prior art equipment that the switch adapter of FIG. 2 enhances. The apertures 54 are used with fasteners 56 to attach the elevator switch to the switch box 50 the trigger 48 rotates around pivot 58 that is connected to the linkage 32 of the elevator system.

The switch arm 52, allows normal operation of the elevator when in the center, a horizontal position. This operational position is demonstrated in FIG. 5. The switch arm is prevented from being in the up off position by the stop flange 38. And the switch arm 52 is biased in the central, horizontal operational position by the spring 40. FIG. 5 shows the switch adapter 36 and switch box 50 as would be in normal elevator operation where the trigger 48 is not affecting the switch arm 52.

During periodic testing or in an emergency dissent of event the safety brake 22 actuates the brake linkage 32 to push the trigger 48 against the switch arm 52, overcoming the spring 40 bias and enforcing the switch arm 52 to the lower position to interrupt the electrical control of the elevator. In the position shown in FIG. 6, the electronics are disabled and the safety brake has wedged the elevator and position preventing further dropping. This is evidenced by the trigger 48 being rotated down against the switch 52 caused by the brake linkage 32.

After an emergency descent is arrested, the elevator is then reset by raising the cab of a few inches to release the wedge blocks that also in turn releases the safety linkage pressure. Then, the spring 40 automatically returns the switch arm 52 to the middle, horizontal normal operating position, as shown in FIG. 5.

FIGS. 2, 5 and 6 demonstrate the switch adapter 36 as it would be positioned on one side of the elevator shaft. Like the switch arm 52 that operates off-on-off in the prior art switch box 50, so that it can be placed with either end up to accommodate the position of the trigger 48, so can the switch adapter 36 be fitted onto the switch box 50 with either end up as needed to correctly engage with the switch arm 52. In this way, one design of switch adapter 36 can be used for either left or right side of the elevator by simply inverting it and attaching it to the switch box 50.

Figure 7:
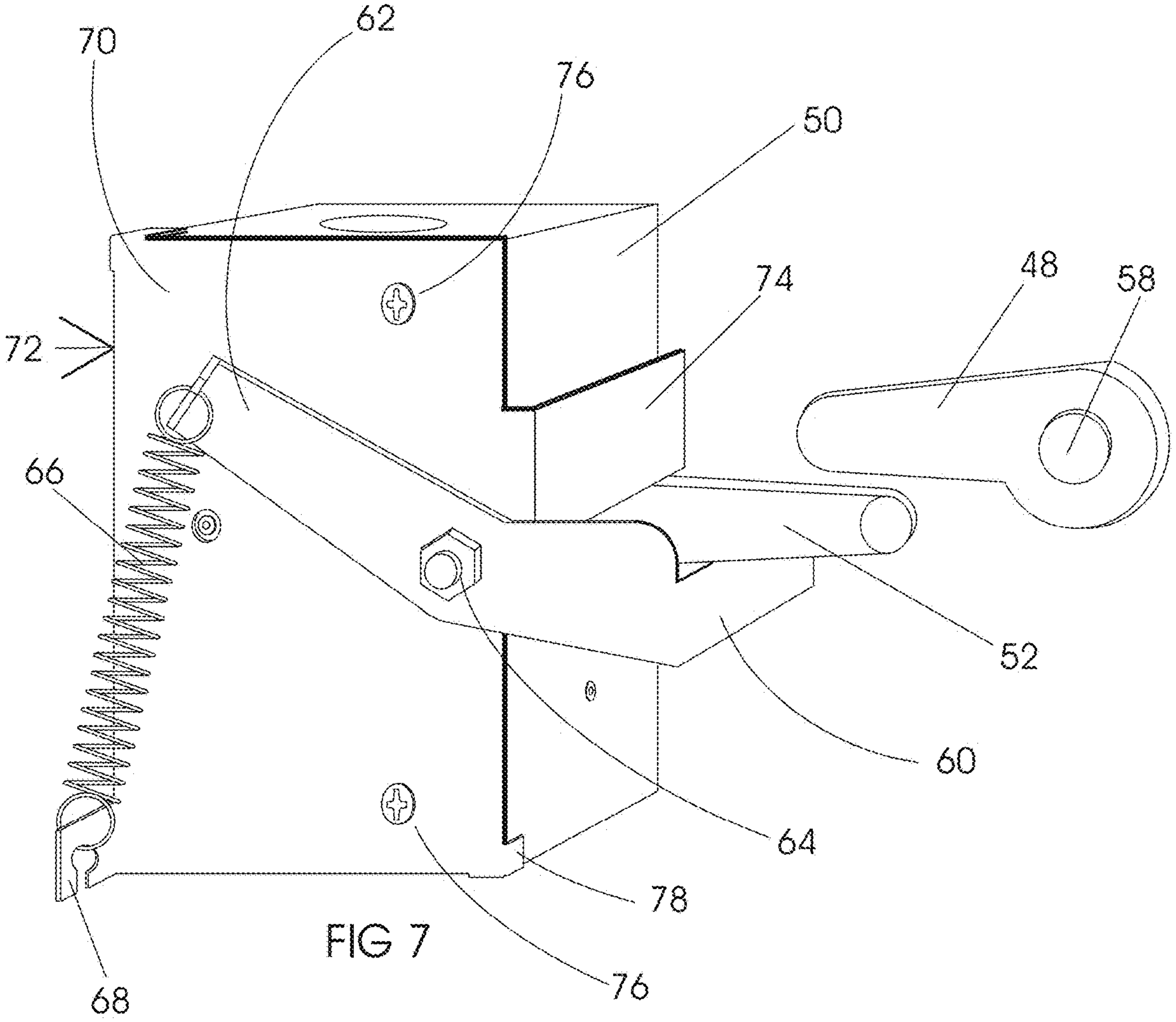
FIG. 7 shows a perspective view of an alternate embodiment of the present device affixed to a prior art switch box in an un-activated mode.
Figure 8:
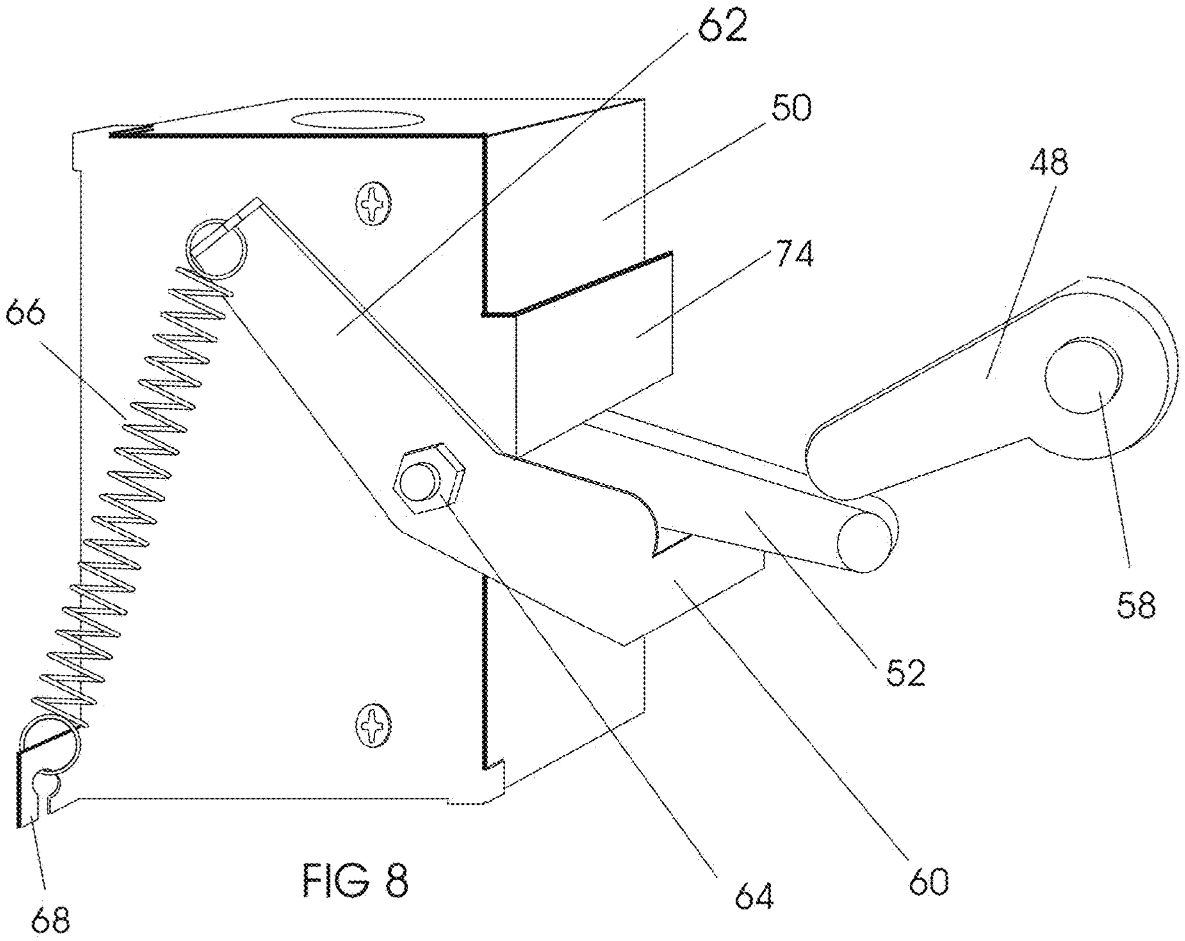
FIG. 8 shows a perspective view of an alternate embodiment of the present device affixed to a prior art switch in an activated mode.
Figure 9:
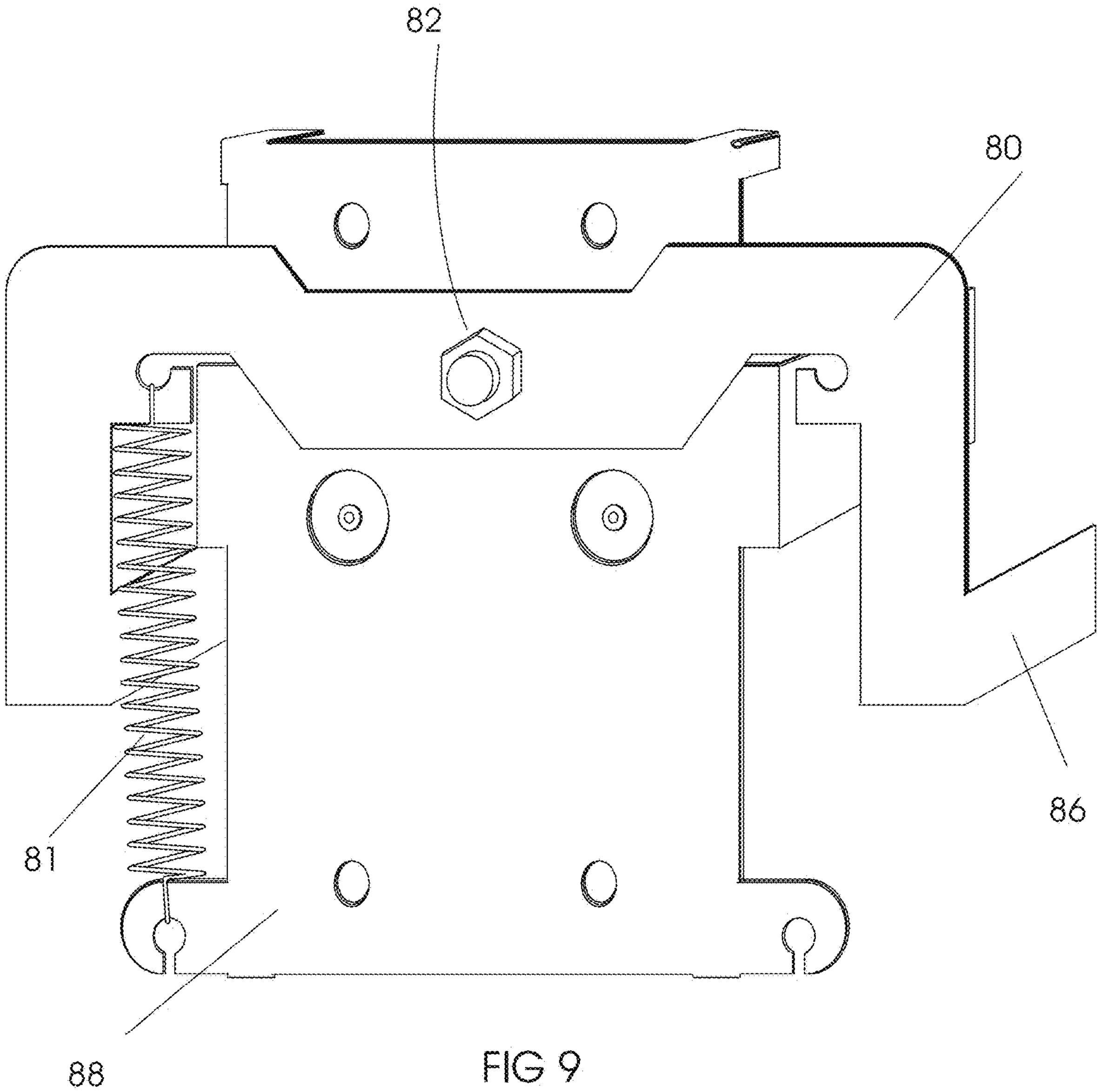
FIG. 9 shows a perspective view of an alternate embodiment of the present device isolated from the prior art switch box.

FIGS. 7 and 8 show a switch adapter 72 with similar performance to the switch adapter's discussed above, but in a slightly different embodiment. In this configuration the spring 66 biases the switch arm 52 to the middle, on position against the stop flange 74. As the safety brake linkage 32 causes the trigger 48 to move about pivot 50, during periodic testing or an emergency desent, the trigger 48 presses against the switch arm 52 thereby cutting power to the elevator.

The switch adapter 72 is fitted to the prior art switch box 50 through plate 70 by means of fasteners 76. Optionally an alignment flange 78 is provided on the plate 72 add strength and aid in alignment of the fasteners 76 when attaching the plate 72 the switch box 50.

The spring 66 is connected at one end to the anchor 68 on the plate 70 and on the other end to the arm 62. the arm 62 rotates freely around pivot 64. The bar 60 biases of the switch arm 52 into the central on position against the stop flange at 74. When the emergency brake is actuated the trigger 48 pushes against the switch arm 52 to disable the elevator. When the elevator is locked in position after actuation of the safety shoes 22 it is then lifted to return the trigger 48 to the normal position that does not press on the switch arm 52. The spring 66 then automatically pushes the switch arm 52 into the Central arm position where normal electrical operation of the elevator can resume.

Figure 10:
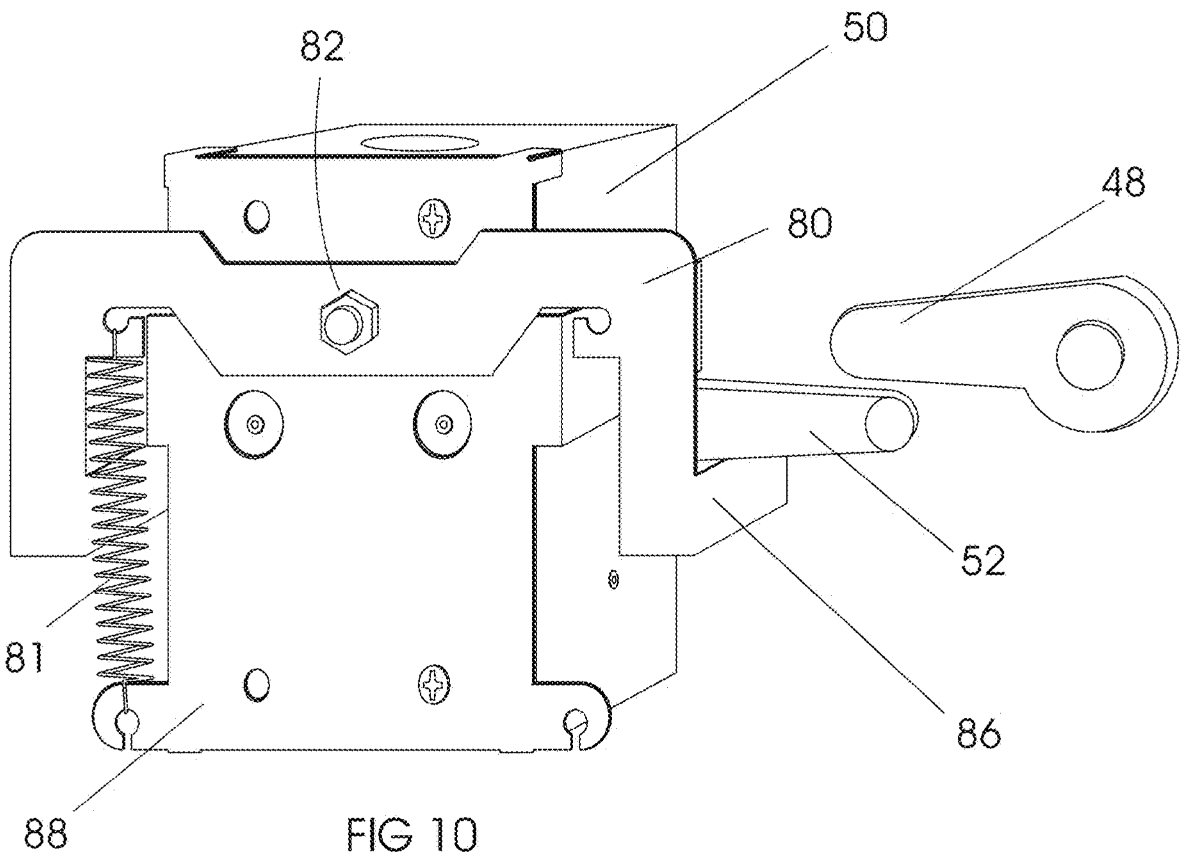
FIG. 10 shows a perspective view of an alternate embodiment of the present elevator switch.

FIG. 10 shows another configuration of the elevator switch that attaches to a switch box 50. Similar to the other designs, the switch arm 50 is held biased and an arm position by the spring 81 under tension pulling the arm 80 and bar 86 against the switch arm 52. As the trigger 48 is activated and moved by the safety brake linkage 32 the switch arm 52 is temporarily forced down to the off position in opposition to the force of the spring 81. As the trigger 48 is relieved when the elevator emergency brakes are removed the switch arm 52 automatically returns to the central on position to permit continued normal operation of the elevator.

All of the designs contained herein are configured to be ambidextrous. Each can amount onto a switch box to allow the switch arm to be normally held in the Central arm position yet be allowed to have the trigger push against the switch arm 52 against the pressure of the spring to temporarily prevent electrical movement of the elevator when the elevator is in an emergency brake situation.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

We claim:

1. An elevator switch adapter comprised of a plate, a stop flange and a spring;

the plate is affixed to an exterior surface of an elevator switch box in either a first orientation or a second orientation;

the elevator switch box houses an off-on-off switch with an operable switch arm;

the switch arm selectably moves between a first off position, a center on position and a second off position;

when the plate is affixed to the elevator switch box in the first orientation then the stop flange is fixed adjacent to the switch arm to block the switch arm from moving into the first off position;

when the plate is affixed to the elevator switch box in the second orientation then the stop flange is fixed adjacent to the switch arm to block the switch are from moving into the second off position;

the spring biases the switch arm into the center on position;

an elevator car safety is linked to the switch arm to selectively force the switch arm to the first or second off position.

2. The elevator switch adapter of claim 1 where the spring biases the switch arm through a pivoting arm with a bar in contact with the switch arm.

* * * * *